(12) United States Patent
Spier et al.

(10) Patent No.: US 7,734,100 B2
(45) Date of Patent: Jun. 8, 2010

(54) SECURE FINANCIAL REPORT AND METHOD OF PROCESSING AND DISPLAYING THE SAME

(75) Inventors: David S. Spier, Wexford, PA (US); Ernest G. Rabatin, Pittsburgh, PA (US); Anthony R. Casale, Gibsonia, PA (US)

(73) Assignee: Dollar Bank, Federal Savings Bank, Pittsburgh, PA (US)

( * ) Notice: Subject to any disclaimer, the term of this patent is extended or adjusted under 35 U.S.C. 154(b) by 938 days.

(21) Appl. No.: 11/520,417

(22) Filed: Sep. 13, 2006

(65) Prior Publication Data

US 2007/0086643 A1    Apr. 19, 2007

Related U.S. Application Data

(62) Division of application No. 11/252,003, filed on Oct. 17, 2005.

(51) Int. Cl.
  G06K 9/48    (2006.01)
  G06K 9/00    (2006.01)
(52) U.S. Cl. ............................ 382/199; 382/137
(58) Field of Classification Search ......... 382/137–140, 382/190, 199, 282; 705/45
See application file for complete search history.

(56) References Cited

U.S. PATENT DOCUMENTS

| | | | |
|---|---|---|---|
| 5,754,697 A | 5/1998 | Fu et al. | |
| 5,852,676 A * | 12/1998 | Lazar | 382/173 |
| 5,895,455 A | 4/1999 | Bellinger et al. | |
| 5,903,881 A | 5/1999 | Schrader et al. | |
| 6,014,454 A * | 1/2000 | Kunkler | 382/137 |
| 6,411,737 B2 | 6/2002 | Wesolkowski et al. | |
| 6,721,783 B1 | 4/2004 | Blossman et al. | |
| 2004/0136586 A1 | 7/2004 | Okamura | |
| 2005/0036680 A1 | 2/2005 | Prakash | |
| 2005/0067484 A1 | 3/2005 | Sellen et al. | |
| 2005/0080719 A1 | 4/2005 | Sellen et al. | |
| 2005/0080738 A1 | 4/2005 | Sellen et al. | |
| 2005/0137979 A1 | 6/2005 | Rekeweg et al. | |

\* cited by examiner

*Primary Examiner*—Daniel G Mariam
(74) *Attorney, Agent, or Firm*—Metz Lewis LLC; Barry I. Friedman

(57) ABSTRACT

A financial report and method for processing and displaying relevant financial information in connection therewith include at least one transaction and abbreviated record relating to the transaction which contains only nonpersonally identifying information. The abbreviated electronic record can be one of a partial view image or an assemblage of textual information relating to the transaction. A hyperlink can also be included or substituted for the image or text. The invention also provides a method of selecting the portion of the abbreviated record that is displayed for the user which includes the division of an underlying document or image into relevant and irrelevant regions for selective inclusion in the report.

7 Claims, 6 Drawing Sheets

ACCOUNT ACTIVITY —400

| | | | |
|---|---|---|---|
| Account: | xxxxxx | | |
| Current Balance: | 213.78 | | |
| Available Balance: | 213.78 | } 405 |
| Activity Available From: | 07/28/2003 | | |

All Activity

| Transaction Date | Transaction Description | Transaction Amount | Ending Balance |
|---|---|---|---|
| 03/24/2005 | POS-MC SHOESTORE SDFF4 —417 ANYWHERE, FL | -16.78 | 213.78 |
| 03/24/2005 | ONL TRANSFER TO SAV | -1800.00 | 230.56 |
| 03/24/2005 | ATM DB - ANYWHERE, FL —418 | -100.00 | 2030.56 |
| 03/23/2005 | CHK 886 SEQ# 00001111 PAYEE: ELECTRIC COMPANY, INC. —430 AMOUNT: $40.00 | -40.00 | 2130.56 } 425c |
| 03/23/2005 | ECK UTILITY COMP 11111111111 CHECKPAYMT CK# 885 | -62.40 | 2170.56 |
| 03/23/2005 | CHK 887 SEQ# 00002101 PAYEE: GAS COMPANY, INC. —435 AMOUNT: $68.56 | -68.56 | 2232.96 } 425b |
| 03/23/2005 | ATM DB - THIRD STREET PLAZA | 2005.00 | 2301.52 |
| 03/22/2005 | POS-MC GAS SERVICE STATION ANYWHERE, FL | -23.00 | 296.52 |
| 03/22/2005 | CHK 888 SEQ# 12001010 Pay to the Order of Phone Company Inc $40.00 —440 | -40.00 | 319.52 } 425a |
| 03/22/2005 | POS-MC CLOTHING STORE SNSS2 ANYWHERE, FL | -56.97 | 359.52 |

FIG. 5

ACCOUNT ACTIVITY ~400
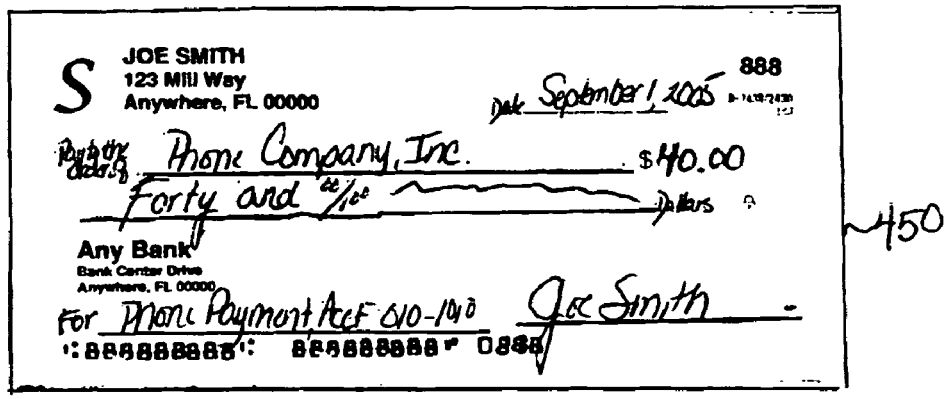
~450
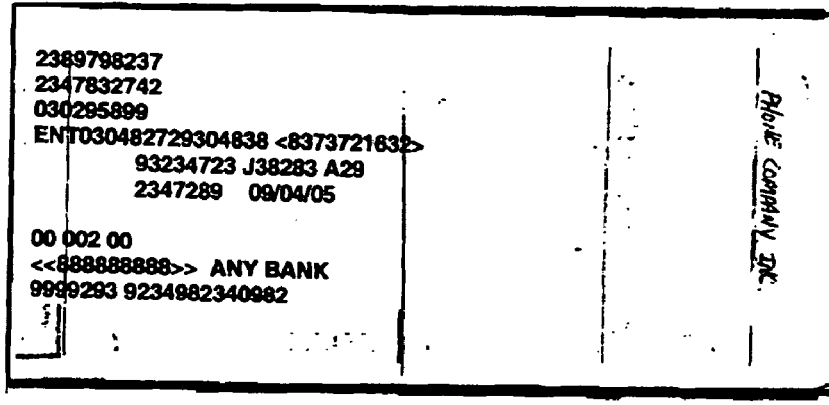
~460
FIG. 6

SECURE FINANCIAL REPORT AND METHOD OF PROCESSING AND DISPLAYING THE SAME

CROSS REFERENCE TO RELATED APPLICATION

This application is a division of co-pending U.S. application Ser. No. 11/252,003, filed Oct. 17, 2005.

FIELD OF THE INVENTION

The present invention relates to processing and displaying financial information which may include one or more digital images of a hardcopy bank instrument from which certain personal information is excised from the viewable image. The partial view digital image of the hardcopy bank instrument contains only the information necessary to identify particular transaction information associated with the hardcopy bank instrument and is exclusive of any payor personal information. In addition, the invention is directed toward a method of automatically locating and reproducing the relevant portion of the hardcopy bank instrument in the form of a digital image. Further, the invention includes the ability to process and display one or more partial view digital images of each hardcopy bank instrument in conjunction with associated payment and/or reporting activity in an electronic format, such as on an online banking web site or in other formats, such as a traditional paper activity statement.

BACKGROUND OF THE INVENTION

The use of electronic banking and record keeping has been increasing and conceivably may be the method by which most banking and other financial transactions will be conducted in the future. Electronic and online banking presents a user with the technological option of bypassing the time-consuming, paper-based aspects of traditional banking so that financial accounts may be managed more quickly and efficiently. For example, a user may access online banking through a global communication network to view account balances and account activity of certain financial accounts; transfer money between accounts; pay bills; view images of cancelled checks and print copies of viewed checks or other transactions and activity.

One shortcoming of existing online banking methodologies relates to user privacy and security of both financial and related personal information. In many cases, only one layer of security exists between a user, whether authorized or unauthorized, and access to this information. This layer of security is typically in the form of a shared secret. The shared secret is a common security method for accessing financial or personal user information, which may be confidential and forms an integral part of user authentication in the current online environment. The shared secret usually consists of a word or group of words, numeric data or some random combination of letters and numerals that are exchanged between and known to both the user and the holder of the financial or personal user information. When the user provides the shared secret data that matches the data previously exchanged between the parties, the user is granted access to the information.

There are several forms of shared secrets that may be utilized in any combination. For example, the most common type of shared secret is a user identifier and password. Challenge questions are another type of shared secret often used to provide a greater level of confidence of user authentication because the challenge questions are directed toward somewhat more personal data. For example, when the user logs into an online banking web site, the financial institution may display, to the user, at least one of a group of preselected challenge questions for which the user has previously provided an answer. The user must provide the appropriate answer to access the online banking web site and user information. Shared secrets serve as a barrier to access and should never be disclosed by the user. However, there are multiple ways to purloin shared secret data regardless of whether such data has been disclosed by the user.

For example, e-mail phishing is one of the fastest growing methods of fraudulently acquiring sensitive access information. Phishing is a term used to describe the action of assuming the identity of a legitimate organization, or web site, such as through the use of email or a web page, with the objective of convincing a user to innocently share user names, passwords and financial or personal information. The information provided by the unwary user is often used to commit crimes, such as fraud and identity theft.

To gain a user's trust and information, a potential wrongdoer electronically poses as a financial institution or other legitimate company. The wrongdoer sends an e-mail to the user that is formatted to appear as legitimate correspondence from an institution with which the user may have an account. The e-mail may contain a reproduced logo or other indicia of legitimacy copied from a web site of an organization or corporation, which is intended to deceive the user. The e-mail typically requests that the user update certain personal information online such as financial data and financial account numbers, account usernames, credit card numbers, passwords, social security numbers or other similar information that a legitimate organization or corporation is likely to have regarding that user. The wrongdoer informs the user that the information can be updated by visiting a particular website, for which a link is typically included in the email. The link directs the user to a counterfeit website designed to trick the user into divulging the personal information.

Many financial institutions prefer to supplement shared secrets with additional security measures in order to gain access to sensitive information. One method utilized to provide assurances against phishing practices is the use of a digital image in conjunction with an associated phrase during user log in. Specifically, the user chooses a particular image from a range of graphical files provided by the financial institution. The user adds a personalized phrase to be associated with the selected image. Only the user and the financial institution know which image and particular phrase have been selected. When the user logs in to the financial institution website, the secret image and associated personalized phrase are displayed to the user. Therefore, the image and phrase function as a type of reverse password to assure the user that the site is the legitimate site of the financial institution.

Some financial institutions have added a physical object as a barrier to access, which serves the purpose of a key. One example of a physical object is a security token that is utilized to prevent access by an unauthorized user. An example of this is the RSA SecurID Authenticator, which is a security token manufactured by RSA Security, Inc. of Bedford, Mass. The security token functions like an ATM card as the user must be identified by both something that the user knows and something that the user has before access is granted. Security tokens are currently used to securely access virtual private networks and other remote access applications, web servers and applications and network operating systems. Security tokens have been utilized recently in other applications, including online banking applications.

To use a security token, a user is provided with a personal device which displays a code number. The device is synchronized to a server and based on logic, time and other parameters, the server can recognize whether numbers entered by a user, as displayed on the personal device, match the corresponding register of the server. Specifically, the user reads an ever-changing number on the screen of a device and types the number, as requested, during log in. A server at the financial institution maintains a separate, synchronized register which corresponds to the number displayed on the personal device. When the user enters the appropriate number, the server validates the user. The user therefore requires a password plus a physical object to gain access to an account. An unauthorized user would have to obtain the token, as well as the log in credentials of the user, to access any financial and personal user information.

Each of the above described methods of protecting financial and personal user information are useful to keep unauthorized individuals from gaining access to this information through improper means at the initial point of access. However, once the correct log in credentials are obtained and access is granted, the financial and personal user information may be freely accessible by anyone. It should be noted that an unauthorized user does not necessarily need to obtain the appropriate log in credentials to access the user's retained information.

For example, such unauthorized access may be obtained through the cache of an Internet browser program. The browser cache contains temporary files, similar to a travel record, of the items a user has seen, heard or downloaded from the Internet, including images, sounds, web pages and cookies. A computer requires less time to display a web page when some of the elements of the page or even the entire page can be called up from the local temporary Internet folder. Thus, storing these files in the browser cache enables more efficient Internet browsing. Caching is not limited to entire web pages but can also include user names, passwords, financial and other sensitive information that may have been entered by the user on a web page.

Typically, a computer terminal with multiple users or a public computer terminal, such as one located in a library, hotel or other public place, is accessible to almost anyone. Most often, browser settings are usually not set to automatically delete temporarily stored information. Consequently, public computers are not a safe place to view certain financial and personal user information. Clearing the browser cache ensures that any individual engaged in a subsequent browser session or otherwise having access to the same computer terminal, particularly on a public computer terminal, will not have access to this information.

Some financial institutions utilize a session cookie to prevent subsequent users from viewing online banking web pages previously viewed by another user. However, a session cookie only protects the user who has logged off from the online banking session. A user may leave a computer terminal unattended while logged into an online banking web site for a number of reasons, including carelessness. In such a situation, any person gaining access to the computer has access to the same information as the authorized user.

After the unauthorized user gains access to financial and personal user information, there are a number of ways the victim can be defrauded. The unauthorized user can utilize the bank's online bill-paying function, an increasingly popular and heavily marketed feature, to have checks made out to himself or to pay his own bills. In an account with wire transfers enabled, the unauthorized user could transfer money to another account, often one in an overseas bank.

Many online banking web sites incorporate access to full digital images of hardcopy bank instruments into account activity reports or other electronic statements. Prior art embodiments reproduce a full view digital image of an online banking user's canceled checks which include all of the financial and personal information printed on the face of the check, such as the user's name, address and account number. Other information handwritten on the face of the check may include a telephone number, social security number or credit card account number, as required by the payee. The unauthorized user can view an image of a canceled check online and then use the check image to create a forged check or misappropriate the information on the face of the check for improper purposes. With regard to privacy and security of financial and personal user information, it is therefore desirable to reduce the amount of personalized information that is part of an electronic transmission associated with online banking, even with appropriate account protections in place.

Systems which specifically include the use of such images include, for example, Blossman, et al., U.S. Pat. No. 6,721,783, issued Apr. 13, 2004, which discloses an e-mail controller that delivers monthly account activity statements and notices through communication and other e-mail networks as an alternative to printing paper account activity statements. The emailed statements include at least one of a full front view and back view image of each processed hardcopy bank instruments, such as deposit slips or canceled checks. The e-mail controller comprises an electronic formatted statement shell in which lists of transactions associated with a user account can be inserted. Further, an image link is provided in the statement shell that defines an electronic path from a listed transaction to at least one full view image of a hardcopy bank instrument. The file associated with each image link is stored in an appropriate database. The hardcopy bank instruments may be serial numbered, such as a check, although non-serial numbered bank instruments may also be included. Non-serial numbered bank instruments include NSF notices, deposit correction notices and account sweep transaction notices.

A digital image of each hardcopy bank instrument can be created using a typical proof-of-deposit imaging system which includes an image database file, an imaging device and software and a check clearing/proof-of-deposit subsystem. The imaging device, in conjunction with imaging software, is used to scan a full front view and back view of each hardcopy bank instrument and create at least one digital image of the instrument. Each view is typically a separate digital image. Each hardcopy bank instrument and corresponding image or images are sorted according to accounts held at the particular financial institution performing the imaging and accounts held at other institutions. The bank instrument information is electronically coded, if appropriate, in a database record linked to the corresponding images. This information includes the dollar value of the paper check or hardcopy bank instrument and other information necessary to post the transaction, such as a serial number, a sequence number or bank account number.

The user can pre-establish preferences with respect to the statements that include the manner by which the user prefers the digital images to be presented. For example, the user can set a minimum dollar value for the inclusion of certain images with respect to both serial numbered and non-serial numbered hardcopy bank instruments. The user may also choose to receive front views only of hardcopy bank instruments, back views only of hardcopy bank instruments or both front and back views of hardcopy bank instruments. Accordingly, there are two image links for each hardcopy bank instrument that may be included in the electronic statement shell. The first image link defines the electronic path to the front view of the hardcopy bank instrument and the second image link defines the electronic path to the back view. Only the image links defining the path to digital images that meet the user's preferences are included in the emailed statements.

The hardcopy bank instrument images created in Blossman are full front view and back view images. Each image link inserted into the electronic statement shell represents an image link corresponding to a full view image of at least one side of the bank instrument. When the user sets preferences regarding the selection of hardcopy instrument images to be received with the electronic statement, the user's choices are limited to one or both of the full front and back view images. The user must accept a full view image of at least one side of a selected hardcopy instrument, and the full view image contains all of the user's financial and personal information. This limitation of choice can be problematic with respect to receipt of the electronic statement and corresponding images by e-mail. Specifically, the use of a web-based e-mail presents the same issues with respect to the browser cache, as described above. Blossman's transmission of hardcopy bank instruments containing all of the user's information enables an unauthorized viewer to misappropriate such information.

Fu, et al., U.S. Pat. No. 5,754,697, for Selective Document Image Data Compression Technique, issued May 15, 1995, relates to a document image data compression technique and, specifically, the selection and compression of certain essential information apart from the background information in a document. Fu discusses the obligation of financial institutions to retain certain types of financial information, including checking account information, for a period of seven years. Typically, a financial institution provides cancelled checks to account holders on a regular periodic basis. If the financial institution chooses to retain the physical check, the information must be stored. Storage of such information in a digital format is much more preferable than in a hardcopy or microfilm format due to the physical space requirements of the documents.

Digital images still require a large amount of disk space to store and a large amount of bandwidth to transmit. A digital image with increased resolution consumes a considerable amount of diskspace. Although compression techniques have evolved, issues still exist with respect to image quality. Thus, the imaging technique utilized must be sensitive enough to enable accurate detection and depiction of the relevant transaction information, including the signature on the check, the amount and the payee name.

Fu provides a method of creating an image of a hardcopy bank instrument having certain information extracted from the background. The image is created through a process that involves contrast enhancement; conversion to a two-color format and compression of the resulting data. Fu discloses that it is only necessary to store a portion of the information of a document in a digitized image. Therefore, the non-essential or background information can be eliminated before the image is compressed and stored or transmitted.

For example, bank checks include different types of information including colored check designs, the account information of the user printed along the bottom of the check, the financial institution identification information and other data that is entered by the payor. The background information is defined by Fu as the design pattern and artwork on the printing stock upon which the financial institution and user information is printed. The background information does not include any information that would identify the payee, the payor or the financial institution. This identifying information remains as part of the digital image that is created from the method disclosed by Fu.

Fu provides an image of a hardcopy bank instrument from which certain information has been eliminated. However, this information is limited to background information consisting of mainly printed check designs, artwork and color. The object of Fu is to create a two-color black and white image in the interest of minimizing file size for storage and exchange. In creating this compressed image, Fu maintains all of the financial and personal identifying information within the image so that user account and transaction information can still be identified from the resulting image.

Prakash, United States Patent Publication No. US 2005/0036680, published on Feb. 17, 2005, discloses a System and Method for Segmenting an Electronic Image. Prakash discloses that many financial institutions are seeking to store and process more hardcopy bank instruments in the form of electronic images. However, these files are typically large and the creation of such images involves sophisticated techniques and equipment. Further, a bank may want to identify and store only specific textual or written areas from the foreground of a check image such as dollar amounts, signatures, and payees, while eliminating any necessary background information, such as a check design or other artwork.

Prakash discloses the conversion of a hardcopy bank instrument into a compressed image, such as a JPEG image. Next the compressed image is segmented into blocks, with a typical bank check comprising approximately 5,967 blocks. Each segment of the compressed image is analyzed and assigned an appropriate frequency coefficient. For example, if the image is a JPEG image, the proper coefficient is a Discrete Cosine Transform, or DCT, coefficient value which represents the average video value of the block. Once the coefficient value is computed for each block, the sums are examined and used to distinguish between foreground segments and background segments. The identified foreground segments that contain the desired information will be stored, outputted or processed, as needed. The resulting image of Prakash is based on the elimination of certain background data. However, similar to Fu, the background data that is eliminated comprises only data such as a check design or artwork. Thus, any data that may identify the payor, the payee or the financial institution is maintained as part of the image.

What is lacking in the art is a method of providing sufficient graphical or other financial data from a hardcopy bank instrument sufficient to enable the user to extract useful transaction information. The image or other data is carefully edited, however, to exclude or otherwise mark any particular personal information which might enable a third party to utilize such data for improper purposes.

SUMMARY OF THE INVENTION

A financial report and a method for processing and displaying relevant financial information is disclosed which includes an abbreviated electronic record of or relating to a hardcopy bank document or transactional information. The methodology is preferably employed during the processing of a document to extract certain information from the original document. The abbreviated electronic record may be in the form of a partial view digital image or an assemblage of textual information relating to a particular transaction. This information is ultimately included in a financial report, as will be described further herein.

The report and method are preferably directed to the creation of an abbreviated electronic record in the form of a partial view image that may be created from either a paper copy of the bank instrument or a previously created full view digital image. A digital image of the document is reproduced from which certain portions likely to contain personally identifying information, such as preprinted information regarding the payor or the payor's financial institution, or similarly identifying handwritten information, have been excised from the viewable image. The resulting image is a partial view image that contains only certain preselected identifying information relating to the transaction which enables the user to identify the transaction or document. The information remaining is also not useful for any third party. In certain circumstances, this partial view image may be substituted by a textual summary. This assemblage of textual information may be determined from metadata that is coded during the processing of the hardcopy bank document.

The financial report may further substitute the image and/or text with a simple hyperlink that directs a user to a separate display of a partial view digital image upon its selection.

In the case of a bank instrument, such as a check, the partial image preferably contains only that information sufficient to identify the associated transaction to the account holder. In a preferred embodiment, hardcopy bank instruments from which partial view images may be created include deposit slips, withdrawal slips and NSF notices. Specifically, if the hardcopy bank instrument is a check, as illustrated in the preferred embodiment, the payee name and amount of the check may be displayed for the viewer in the absence of the payer's personally identifying information from the front of the same check.

The disclosed method may also be directed toward the selection of the portion of the abbreviated electronic record that is to be displayed. A partial view image may be created using well-known imaging devices and associated software from a full view image by dividing the full view image into a series of sections or regions to determine the location of certain reference points and boundaries which define the partial view image of the hardcopy bank instrument. The image format of the full view and partial view images may be JPEG, PDF, TIFF, GIF, PNG or any other known electronic format suitable for the reproduction of such images. If the relevant portion of the full view image cannot be located from the described methodology to create the partial view image of the hardcopy bank instrument, an error handling process may be invoked that is used to extract an approximation of the relevant portion. The partial view image of the hardcopy bank instrument may be saved and stored in an appropriate database record and associated with other files corresponding to a full view image of the same hardcopy bank instrument and certain coded metadata.

The partial view image may also be stored in a database for fast retrieval upon request of the user or the financial institution. Such request may be in the form of an online account activity report or other electronic statement. When the user requests account activity for a certain period of time, the partial view image of the bank instrument may be presented in connection with a particular associated transaction, being directly viewed, accessible by hyperlink or the like. The partial view image may be a static image or it may have additional features. The user may select the partial view image for a full view image of at least one side of the hardcopy bank instrument. The user may also request a partial view image of a hardcopy bank instrument in connection with the use of budgeting or reconciliation software. The partial view image may also be incorporated into periodic paper account statements.

These and other advantages and features of the present invention will be more fully understood upon reference to the presently preferred embodiments thereof and to the appended drawings.

BRIEF DESCRIPTION OF THE DRAWINGS

FIG. 5 is a diagrammatic representation of account activity report including partial digital images.

FIG. 6 is a representation of a digital image of each of the full front and back view of a payor check displayed in connection with the account activity report displayed on an online banking web site.

DESCRIPTION OF THE PREFERRED EMBODIMENTS

Figure 1:
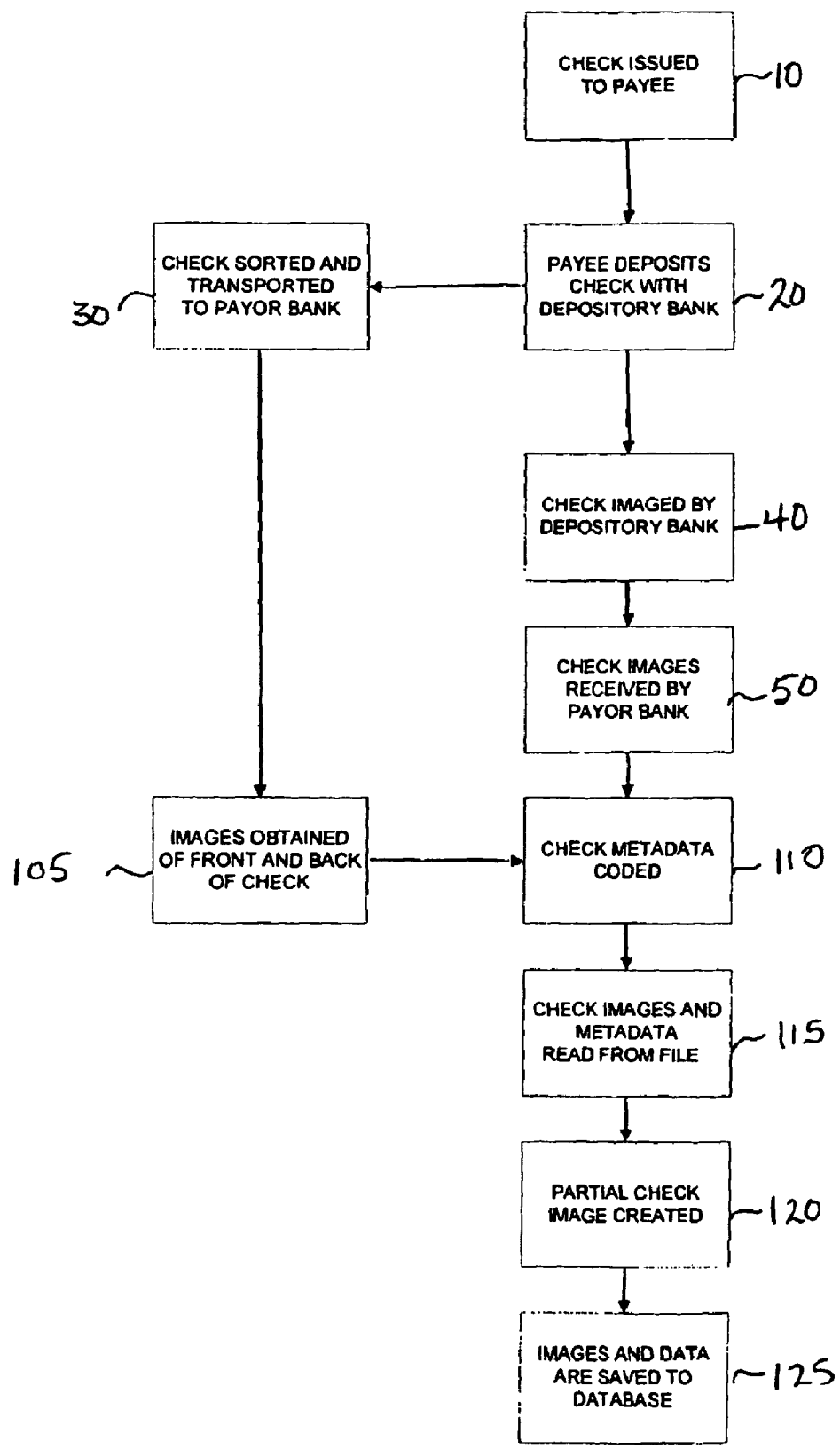
FIG. 1 is a block diagram of the methodology for creating a digital image of a hardcopy bank instrument according to the present invention.

FIG. 1 is a block diagram illustrating the creation of a digital image of a partial view of a hardcopy bank instrument from either the actual hardcopy bank instrument or a full view digital image of at least one of the front view or the back view of the hardcopy bank instrument. The full view digital image from which a partial view digital image is created is a typical image that can be exchanged electronically by financial institutions, printed for account activity purposes or displayed on online banking websites.

Certain legislation has been recently enacted regarding the processing of paper checks that permits financial institutions to exchange digital images of hardcopy bank instruments as the equivalent of the same. Although the legislation does not mandate the use of such images, digitalization is encouraged to reduce paper and permit financial institutions to easily automate the payment clearing and check collection process. Accordingly, a full view digital image of a hardcopy bank instrument may be created at any point in the collection process. The digital image may be created by any collecting financial institution involved in the processing of the bank instrument or the financial institution of the user upon which the bank instrument is drawn. Such financial institutions may include any national or state financial institution, federal or state savings financial institution, credit union or savings association.

Figure 2:
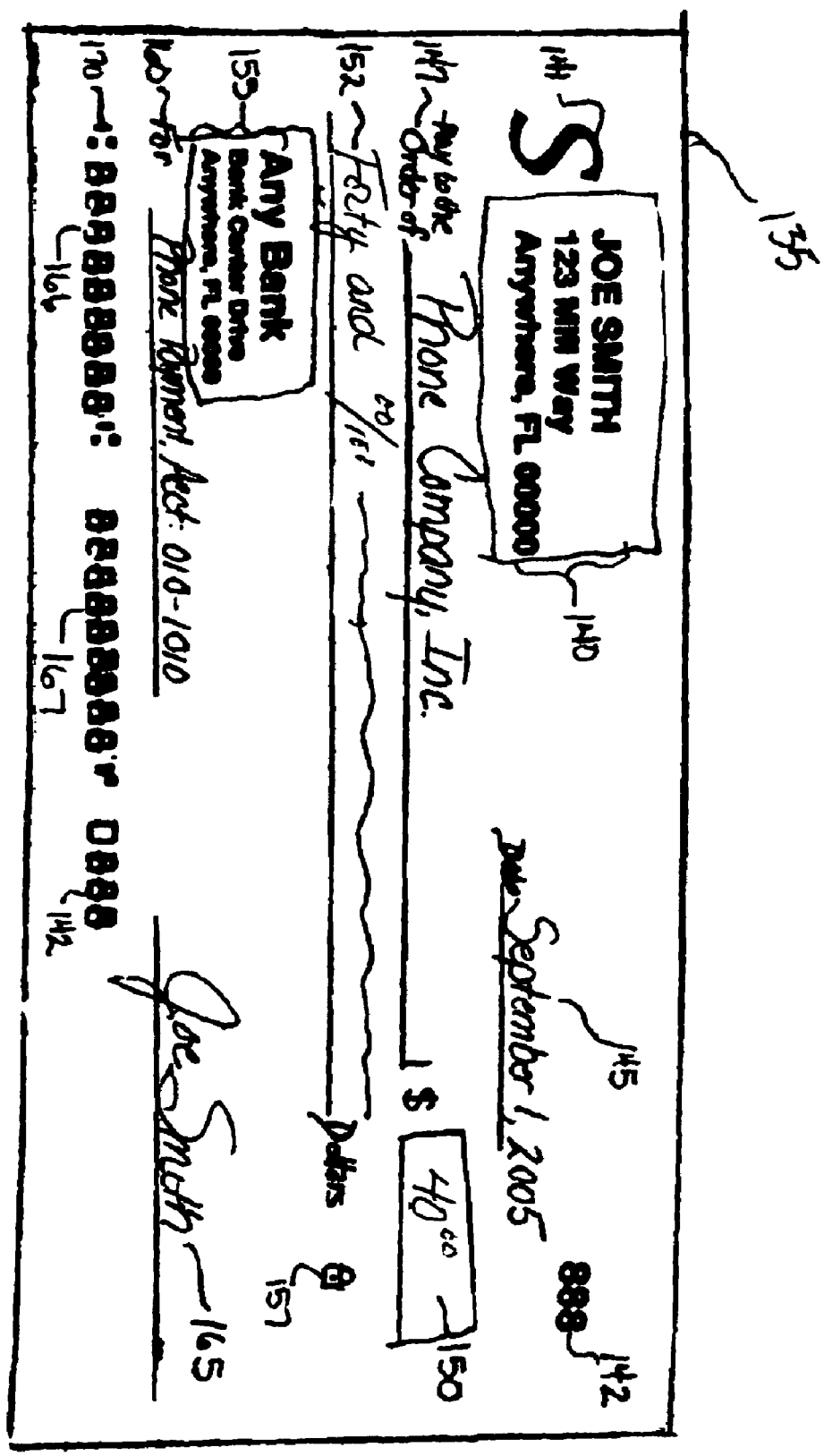
FIG. 2 is a diagrammatic representation of a typical bank check.

Referring to FIGS. 1 and 2, at step 10 the user issues a hardcopy bank instrument, such as a check 135, to a payee that is drawn on the user's financial institution, which is also referred to as the payor bank. FIG. 2 is a representation of the face of a typical check 135 which is addressed to a payee. Check 135 includes personalization text 140 which may have up to five lines available for the personalization of check 135. The information typically listed in personalization text 140 of check 135 includes a payor name and address in addition to other optional information that the payor may choose to include such as a telephone number, a driver's license number or a social security number. Cut 141 is located to the left of personalization text 140 and may include an optional cut, such as a decorative image, or a monogram, if the design of check 135 permits.

Check number 142 includes the sequential number of check 135 and appears in both the upper right corner of check 135 and in MICR line 170 at the bottom of check 135, as further described below. Check number 142 serves the purpose of a tracking number so that the payor can track either a specific check or the number of checks that have been issued. Date 145 is typically the date that the payor presents check 135 as a form of payment to the payee, although check 135 may have a date that is not the current date. Payee line 147 represents the area where the payor identifies the individual or business to which the check is written. Dollar box 150 is the area where the numeric amount of the check is written in Arabic numerals. The numeric dollar amount is written in text on amount line 152 which is typically located below payee line 147 on check 135. Padlock icon 157 references security features that are included on check 135 to aid a bank in identifying check fraud. The security features are usually described on the back of check 135.

Financial institution information 155 includes the identifying information regarding the financial institution where the payor holds an account associated with check 135. Financial institution information 155 must include at least the financial institution name, although other information, such as the address of the financial institution, may be included if the design of check 135 permits, or if required by the financial institution.

Memo 160 is an area provided on check 135 where the payor can write personal information that may assist the payee in associating check 135 with a particular customer account, for example, if the payee is a merchant. Such payor-provided information of memo 160 may include an account number, a driver's license number, a credit card account number, a social security number or a telephone number. The payor may also choose to include information in memo 160 of check 135 that will assist with later identification and association of check 135 with a particular transaction for the purpose of the personal bookkeeping of the payor.

The payor endorses signature line 165 to authorize the processing of check 135 by the payee. MICR line 170 is the area that contains certain identifying information, in numeric format, to facilitate the automated processing of check 135. MICR line 170 consists of several fields of numbers printed in magnetic ink near the bottom of the front of the check. These numbers include routing number 166, which identifies the bank on which the check is drawn; account number 167, which identifies the account of the payor from which the funds are to be withdrawn and check number 142. However, other information may be included in MICR line 170, if required by the financial institution.

Certain information that can be printed or handwritten on check 135 includes personally identifying information that may be used for an improper purpose. For example, by knowing routing number 166 and account number 167, an unauthorized viewer can cause a money transfer from the account of the user. More importantly, if the user has handwritten any personal or other identifying information in memo 160, such as a social security number, this identifying information, when used in connection with the information contained in personalization text 140, may subject the user to a risk of identity theft. Similarly, the information indicated by financial institution information 155 and signature line 165, when either is used in combination with other personally identifying information of check 135, can also provide an unauthorized viewer with an advantage. Many of the purposes served by online banking do not require access to a full view image of the relevant hardcopy bank instrument. The most common need for the entire canceled check is in the rare case of fraud. An online banking user typically requires access to only that partial view of an image of check 135 that provides the payee information necessary to identify the transaction. Any question regarding the validity of check 135, in most cases, can be resolved by separately requesting a full copy of check 135 from the user's financial institution.

In the prior art embodiments of an online banking web site that displays account activity in conjunction with imaged hardcopy bank instruments, at least a full front view image of check 135 representing each particular element of check 135, as described, is typically presented to the user. The present method is directed to the creation of an abbreviated record of check 135, as further described with respect to FIGS. 3, 4 and 5. The abbreviated record may be in the form of a partial view image of a hardcopy bank instrument or an assemblage of textual information that relates to the same. The abbreviated record is displayed in connection with a user's account activity reports or electronic statements on an online banking web site. It is noted that although the method is directed to the creation of an abbreviated record in the form of a partial view image of check 135, abbreviated records can be created of many other hardcopy bank instruments, including but not limited to deposit slips, withdrawal slips and NSF notices.

Referring again to FIGS. 1 and 2, the payee deposits a hardcopy check 135 at step 20 at the payee's financial institution, also referred to as the depository bank. Check 135 is processed at step 30 which includes the crediting of the payee account for the amount of check 135. The amount of check 135 corresponding to the numeric amount in dollar box 150 is then encoded in the lower right hand corner of the face of check 135 along MICR line 170. After the amount of check 135 is encoded, each check 135 is sorted automatically based on routing number 166 contained within MICR line 170 and transported to the proper payor bank. When the payor bank receives check 135 from the depository bank or other financial institution in the collection process, the payor bank provides the appropriate credit to each financial institution in the chain of collection.

Next, an imaging device, equipped with the appropriate imaging software, is used to capture a full view image of both the front and back of check 135 at step 105. The full view image of check 135 is created through the use of well-known imaging devices of the type typically used to create electronic copies of hardcopy bank instruments. The imaging software has an associated database, such as an image database, in which each image that is created can be saved to a database record and stored for retrieval. Each full view image of the front view and back view of check 135 is a digital image that may be saved in a variety of formats, as further described with respect to FIG. 3.

The check also may have been imaged by another financial institution in the collection process. For example, at step 40 the check may have been imaged by the depository bank. The check created at step 40 is an electronic reproduction of the original hardcopy check in digital format. Specifically, this reproduction must contain images of both the front and back view of the original hardcopy check. MICR line 170 must be fully visible so that associated automated processes are not affected and the check image is suitable for such automatic processing in the same manner as the hardcopy check.

Regardless of whether the full view image of the hardcopy instrument is created by the depository bank or the payor bank, certain metadata associated with check 135 must be coded at step 110 to the appropriate database record of a database that may also contain full view images. The metadata, which can be coded at any time before the creation of the partial view digital image of check 135, includes information such as the date on which check 135 was processed, check number 142, account number 167, an amount, a payee and the sequence number of the transaction. The metadata must be coded to the appropriate database record either associated with or containing the full view image or images of check 135 that is further associated with any related partial view image of check 135. The metadata must be coded so that the full front view and back view images of check 135, in addition to the partial view image of check 135 are searchable by the online banking user. The metadata and partial view digital images, in connection with specific transaction data for most or all of a user's transaction, are used to create a transaction list for account activity reports or electronic statements, as further described with respect to FIG. 5.

To create a partial view digital image of check 135, a full view image of one view of check 135 and the associated metadata are read from the particular database record at step 115. A partial view digital image of at least one full view image, preferably the front view, of the stored check image is created at step 120, as further described with respect to FIG. 3. Once the partial image of the full front view of the check image is created, the partial view image is stored at step 125 in association with the full front and back view images of check 135 and its associated metadata.

Figure 3:
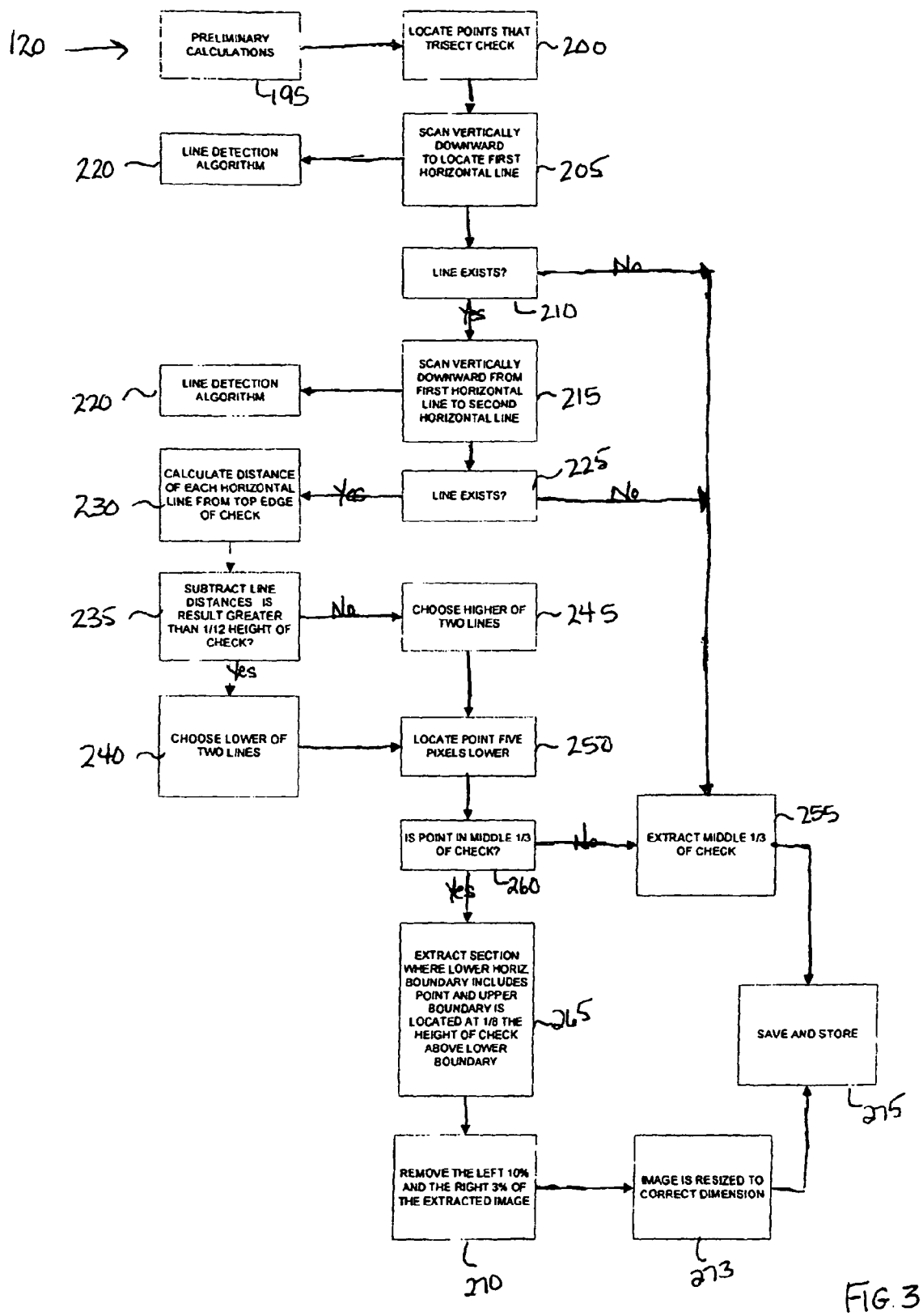
FIG. 3 is a block diagram of the data extraction methodology for creating a digital image of a partial view of a hardcopy bank instrument according to the present invention.

Referring to FIGS. 2 and 3, a partial image of check 135 can be created at any time after receipt by the payor's financial institution of check 135 at step 30 or full view image of check 135 at step 50. The partial view image of check 135 is preferably created from a full front view image of check 135. If at least one full view image of check 135 is not created by any collecting bank during the payment collection process of check 135, the image must be created by the payor's financial institution. The image format of the full view image may be a JPEG, PDF, TIFF, GIF, PNG or any other known electronic format suitable for the reproduction of such images. The full view image format is preferably a one bit, two color black and white image to enable the creation of a partial view image with this method, however the image may be a gray scale or other color image.

To create the partial view image of check 135, the imaging software is initialized and a full front view image of check 135 is obtained at step 105, if such full view image is not received at step 50. Once the metadata is coded to the database record associated with or containing the full view image or images of check 135, the full view image or images and metadata are read from the database file. Referring to FIG. 3, the imaging software automatically calculates certain preliminary measurements from the full front view image at step 195 that are used in further calculations performed in subsequent steps. Such certain preliminary measurements may include the height and the width of the full view image of check 135.

At step 200, two points on the full view image are located that correspond to the vertical trisection of the full view image of check 135 into three horizontal sections. The first point is the origination point for the creation of the partial view image and the second point is the terminus point for the creation of the partial view image, as further explained below. A right-handed Cartesian coordinate system is utilized to calculate the location of the origination point and terminus point and the location of both the first horizontal line and the second horizontal line, as described below. The Cartesian coordinate system is the industry standard for working with digital image data. To locate the two points, the full front view image of check 135 is divided into six equal sections. Specifically, the full front view image of check 135 is divided into one-third sections horizontally from the top to the bottom of the image. Next, the full front view image of check 135 is divided into one-half sections vertically from the left side to the right side of the image. The two points are located on the dividing line between the one-half vertical sections with the first point located on the lower boundary of the first one-third horizontal section and the second point located on the lower boundary of the second one-third horizontal section.

Figure 4:
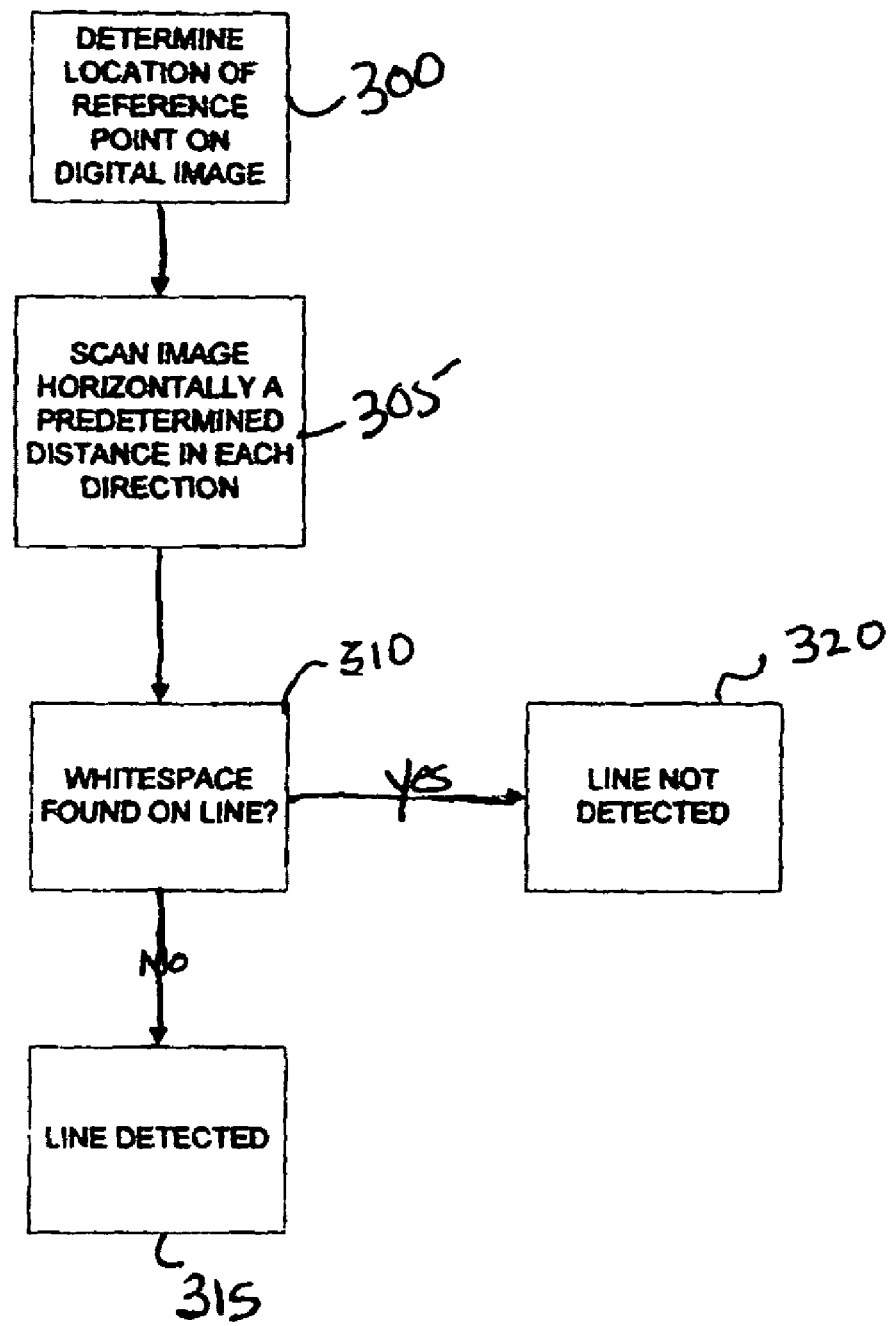
FIG. 4 is a block diagram representing the line detection algorithm utilized in the data extraction process according to the present invention.

Referring to FIGS. 3 and 4, at step 205, starting at the origination point which is the point closest to the top of the image, the full front view image is scanned along a line extending vertically downward in preferably one-pixel increments from this point until a first horizontal line is located. Alternatively, such scanning may continue until the terminus point is reached at which time an error handling procedure is invoked at step 255 if a horizontal line is not detected, as further described below.

The first horizontal line that is located is typically payee line 147 of check 135. If a horizontal line is detected at step 210, the imaging software continues to scan from this horizontal line along the line extending vertically downward from the origination point until a second horizontal line is located at step 215. Again, the vertical distance is scanned in one-pixel increments and such scanning may continue until the terminus point is reached at which time the error handling procedure at step 255 is invoked if a second horizontal line does not exist, as further described below. The first and second horizontal lines are detected through the use of a line detection algorithm 220, as represented by the block diagram of FIG. 4. At steps 205 and 215, line detection algorithm 220 is employed to locate the first and second horizontal lines which are used to determine the boundaries of the partial view image of check 135, as further described in subsequent steps.

Referring to FIG. 4, the location of a reference point, which is preferably the origination point, on a scanned, monochrome digital image is located at step 300, as previously described in FIG. 3 with respect to step 200. At step 305, the full front view image of check 135 is scanned horizontally for a preselected distance from the origination point. This distance is approximately twenty-five pixels in either direction horizontally from the location of the origination point. The image is scanned vertically downward from the given point along a distance of the vertical line, as described with respect to FIG. 3. At one-pixel increments, the imaging software attempts to detect a change or contrast of the pixel color of the image to a color other than white at step 310. If the color of the pixel at a particular increment is white at step 320, a line has not been detected. If the color of the pixel at the particular increment is not white at step 315, a line has been detected. With respect to the first horizontal line located at step 205 of FIG. 3, this line should be payee line 147 of check 135.

Referring to FIGS. 3 and 4, at step 215 the second horizontal line is located utilizing line detection algorithm 220. Once the first horizontal line is located, this line becomes the reference point at step 300. Again, the full image view is scanned horizontally a distance of approximately twenty-five pixels in both left and right directions from the location of the reference point. The image is scanned vertically downward from the reference point along a distance of the vertical line, as described with respect to FIG. 3. At preferably one-pixel increments, the imaging software attempts to detect a change or contrast in the pixel color of the image to a color other than white at step 310. If the color of the pixel at a particular increment is white at step 320, a line has not been detected. If the color of the pixel at the particular increment is not white at step 315, a line has been detected. The second horizontal line located at step 215 of FIG. 3 should be amount line 152 of check 135.

If both horizontal lines exist at steps 205 and 215, the distance of each line from the top edge of check 135 is calculated at step 230 by the imaging software. The calculated distances of each horizontal line from the top edge of check 135 are subtracted from each other at step 235. Based on the height of check 135, as previously determined at step 195, the result obtained at step 235 is compared to the amount equal to one-twelfth the height of check 135. If the difference between the calculated distances is greater than one-twelfth of the height of check 135, at step 240 the second, or lower, horizontal line becomes the horizontal line from which all subsequent steps are taken. If the difference between the calculated distances is less than one-twelfth of the height of check 135, at step 245 the first, or higher, horizontal line becomes the horizontal line from which all subsequent steps are taken. Based on the horizontal line selected at either step 240 or step 245, a point below this line is located at step 250. The point should preferably be approximately five pixels below the selected horizontal line.

At step 260, using the right-handed Cartesian coordinate system, the location of the point located at step 250 is analyzed to determine if the point is in the middle one-third of check 135. If the point is in the middle one-third of the check, at step 265 a section of the check is extracted as the partial view image of check 135. The lower boundary of partial view image is the horizontal line that intersects the point selected at step 260 and the upper boundary is located at a distance above lower boundary equal to one-eighth the height of check 135. From this extracted section, the left ten percent and the right three percent are automatically cropped and removed at step 270. At step 273, the imaging software automatically resizes the extracted section to the appropriate dimensions. The extracted section is saved at step 275 as the partial view image of check 135 and the cropped portions are deleted. The image can be saved in any format as a one-bit, two-color black and white image, as previously described.

The resulting partial view image of check 135 contains the information necessary to identify the transaction and does not include any financial or identifying personal user information. Specifically, the partial view image of check 135 contains payee line 147 and dollar box 152. The partial view image of check 135 does not contain any information that may have been handwritten in memo 160, the numerical identifying information of MICR line 170 financial institution information 155, signature line 165, or the payor name and address contained within personalization text 140.

The size of a standard bank check may vary greatly between financial institutions. Further, the payor has a wide range of sources other than the payor's financial institution from which a selection of checks may be obtained. Most hardcopy checks, and those images created from such checks, should conform to the methodology described in FIGS. 1, 3 and 4 to produce a partial view image of check 135. However, there may be instances of nonconformity, indicated by the nonexistence of a first horizontal line at step 210; the nonexistence of a second horizontal line at step 225; an intersection with the terminus point if neither horizontal line exists, or if the point selected at step 250 is determined not to be located in the middle one-third section of the check. In any such instance, the middle one-third section of the image of check 135 is extracted and stored in the appropriate database record as the partial view image of check 135 at step 275.

Referring to FIG. 5, abbreviated electronic records can be incorporated into the generation of online account activity reports or electronic statements. A financial institution may have as many databases as required to enable the generation of such activity reports or statements, including image databases that contain images of documents relevant to each user's account and financial information databases that contain information relevant to each user's specific transactions. For example, most transaction data is coded in an appropriate database record according to at least the user's account number and the sequence number of the transaction. Similarly, each partial view digital image and full view digital image of check 135, or other hardcopy bank instrument, is stored in an appropriate database record according to coded metadata that can include the user's account number, document number, processing date, payee, if any, amount and sequence number, as previously described with respect to FIG. 1. When a user requests an account activity report or an electronic statement with respect to the user's particular account, each relevant database is automatically queried with respect to the particular searchable coded data or metadata. The query results are presented on the screen for the user with each transaction being merged with an associated abbreviated electronic record, if such image has been created.

FIG. 5 is a representation of an online account activity report 400 that is typical with respect to most online banking web sites. Online account activity report 400 contains an account summary 405 which provides certain information such as account number, the current balance, the available balance and date from which activity is available. A transaction history 415 for selected dates may be presented, or transaction history may start with the latest or the earliest transaction and proceed in the appropriate direction. Transaction history 415 usually includes transactions of all types, such as a point-of-sale transaction 417, an ATM transaction 418 and a check transaction 425. Check transactions 425a-c include check number 142 and any other transactional data, as coded by the bank. Check transactions 425a-c are further represented in the various formats of an abbreviated electronic record. Each abbreviated electronic record of check 135 includes the named payee of payee line 147 and the dollar amount indicated by dollar box 150 of check 135 represented in FIG. 2, as extracted during the extraction process described in FIG. 3. For example, abbreviated electronic record of check transaction 425a includes a partial view image 440 of check 135 presented in connection with the particular associated transaction. Alternatively, the abbreviated electronic record of check transaction 425c is represented as an assemblage of textual information 430. Abbreviated electronic record 425b is represented as an assemblage of textual material in association with a hyperlink 435 directing a user to a separate display of partial view digital image 440 upon selection of the hyperlink. It is to be specifically noted that a new hyperlink may also be presented, not in association with any particular text or other information. This hyperlink would thus provide access to the image containing the relevant transaction information.

Referring to FIGS. 5 and 6, partial view image 430 of check 135 may be a static image within the online account activity report 400, or partial view image 430 of check 135 may have additional features. Referring to FIG. 6, within online account activity report 400 the user can select partial view image 430 of check 135, to view a full front view image 450 and back view image 460 of check 135. The partial view image 430 is linked to the full front view image 450 and back view image 460 which are also stored in the appropriate database record. A financial institution may choose not to provide this feature. Alternatively, if a user chooses to view the full front view image 450 and back view image 460 of check 135, the financial institution may require the user to execute an opt-out provision pertaining to a disclaimer of privacy and security of the user's personal identifying information. In this instance, all of the user's personal information that is excised from the partial view image 430 of check 135 is now displayed for the user or anyone else presenting themselves as the user.

The present method can also be applied to the creation of an abbreviated electronic record of other types of standard documentation evidencing account transactions for insertion into an online account activity report or electronic statement in an online banking program, or other similar application. The partial images may also be incorporated into requests associated with budgeting software and reconciliation software and also monthly paper bank statements.

While the present preferred embodiment of the invention is described, it is to be distinctly understood that the invention is not limited thereto, but may be otherwise embodied and practiced with the scope of the following claims.

What is claimed is:

1. A method of locating and selecting a portion of a digital image to be excised from said image comprising:
   utilizing an imaging device having a processor associated therein to create said digital image;
   utilizing said processor to determine a location of at least two reference points within said digital image;
   utilizing said processor to select at least one of said reference points;
   utilizing said processor to scan said digital image in a preselected direction between said selected reference points to detect at least one horizontal line;
   utilizing said processor to locate a lower boundary point below said detected horizontal line;
   utilizing said processor to identify an excise region of the digital image bounded by a lower horizontal boundary which intersects said lower boundary point, an upper horizontal boundary which is located at a preselected distance above said lower horizontal boundary and the horizontal dimensions of the digital image;
   utilizing said processor to excise said excise region from said digital image.

2. A method of locating and selecting a portion of a digital image of claim 1, wherein said location of said two reference points is determined by utilizing said processor to section said digital image into regions bounded by intersecting lines, the reference points being isolated at the intersection of said intersecting lines.

3. A method of locating and selecting a portion of a digital image of claim 1, wherein said first reference points is an origination point and said second reference point is a terminus point.

4. A method of locating and selecting a portion of a digital image of claim 3, wherein said digital image is scanned vertically downward between said reference points.

5. A method of locating and selecting a portion of a digital image of claim 1, wherein said digital image is scanned in one pixel increments.

6. A method of locating and selecting a portion of a digital image of claim 5, wherein said scanning further comprises the steps of:
   (i) originating said scan at said selected reference point;
   (ii) utilizing said processor to scan horizontally a preselected distance from said reference point;
   (iii) utilizing said processor to detect a contrast in pixel color of said digital image; and
   (iv) utilizing said processor to select a next reference point displaced vertically from said previous reference point and repeating said horizontal scanning until a horizontal line is detected.

7. A method of locating and selecting a portion of a digital image of claim 6, wherein said digital image is scanned for approximately 25 pixels horizontally in at least one direction from at least one of said reference point.

* * * * *